(12) United States Patent
Kawamura

(10) Patent No.: US 9,287,720 B2
(45) Date of Patent: Mar. 15, 2016

(54) NON-CONTACT CHARGING SYSTEM

(75) Inventor: Tamotsu Kawamura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 646 days.

(21) Appl. No.: 13/638,230

(22) PCT Filed: Mar. 29, 2011

(86) PCT No.: PCT/JP2011/057736
§ 371 (c)(1),
(2), (4) Date: Jan. 16, 2013

(87) PCT Pub. No.: WO2011/125632
PCT Pub. Date: Oct. 13, 2011

(65) Prior Publication Data
US 2013/0119925 A1    May 16, 2013

(30) Foreign Application Priority Data
Mar. 31, 2010    (JP) .............................. P2010-081401

(51) Int. Cl.
*H02J 7/00* (2006.01)
*B60L 11/18* (2006.01)
(Continued)

(52) U.S. Cl.
CPC . *H02J 7/00* (2013.01); *B60L 1/003* (2013.01); *B60L 3/0023* (2013.01); *B60L 3/04* (2013.01); *B60L 11/182* (2013.01); *B60L 11/1803* (2013.01); *B60L 11/1824* (2013.01); *B60L 11/1829* (2013.01); *B60L 11/1833* (2013.01); *H01M 10/425* (2013.01);
(Continued)

(58) Field of Classification Search
CPC ........................................................ H01M 10/46
USPC .......................................................... 320/108
See application file for complete search history.

(56) References Cited

U.S. PATENT DOCUMENTS

| 8,090,550 B2 * | 1/2012 | Azancot et al. ................. 702/62 |
| 8,519,666 B2 * | 8/2013 | Terao ..................... H02J 7/025 320/108 |

(Continued)

FOREIGN PATENT DOCUMENTS

| CN | 101304178 A | 11/2008 |
| CN | 101577446 A | 11/2009 |

(Continued)

OTHER PUBLICATIONS

International Search Report that issued in the corresponding International Application No. PCT/JP2011/057736, mailed Jun. 14, 2011.
(Continued)

*Primary Examiner* — Samuel Berhanu
*Assistant Examiner* — Tessema Kebede
(74) *Attorney, Agent, or Firm* — Squire Patton Boggs (US) LLP

(57) ABSTRACT

A non-contact charging system includes: a power transmission device that includes a primary coil supplying electric power through electromagnetic induction; a power reception device that includes a secondary coil receiving electric power by being electromagnetically coupled with the power transmission device; and a control device that determines charging efficiency from the primary coil to the secondary coil and changes the current supplied to the primary coil in accordance with the charging efficiency.

9 Claims, 9 Drawing Sheets

(51) Int. Cl.
*H01M 10/42* (2006.01)
*H01M 10/48* (2006.01)
*H02J 7/02* (2006.01)
*B60L 3/00* (2006.01)
*B60L 3/04* (2006.01)
*B60L 1/00* (2006.01)
*H01M 10/46* (2006.01)
*H01F 38/14* (2006.01)

(52) U.S. Cl.
CPC .............. *H01M 10/46* (2013.01); *H01M 10/48* (2013.01); *H02J 7/025* (2013.01); *B60L 2210/12* (2013.01); *B60L 2210/30* (2013.01); *B60L 2230/16* (2013.01); *B60L 2240/36* (2013.01); *B60L 2240/662* (2013.01); *B60L 2240/80* (2013.01); *B60L 2250/10* (2013.01); *H01F 38/14* (2013.01); *Y02T 10/7005* (2013.01); *Y02T 10/7088* (2013.01); *Y02T 10/7233* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | |
|---|---|---|---|
| 8,566,513 | B2 | 10/2013 | Yamashita |
| 2008/0297107 | A1* | 12/2008 | Kato et al. ................... 320/108 |
| 2009/0015197 | A1* | 1/2009 | Sogabe et al. ................ 320/108 |
| 2009/0174263 | A1* | 7/2009 | Baarman et al. .............. 307/104 |
| 2009/0278523 | A1* | 11/2009 | Yoda et al. .................... 323/318 |

FOREIGN PATENT DOCUMENTS

| | | |
|---|---|---|
| CN | 101635468 A | 1/2010 |
| DE | 42 36 286 A1 | 5/1994 |
| EP | 1 944 851 A2 | 7/2008 |
| JP | 2001-258182 A | 9/2001 |
| JP | 2002-084686 A | 3/2002 |
| JP | 2003-153457 A | 5/2003 |
| JP | 2006-060909 A | 3/2006 |
| JP | 2006-345588 A | 12/2006 |
| JP | 2008-283853 A | 11/2008 |
| JP | 2009-273307 A | 11/2009 |
| JP | 2010-119246 A | 5/2010 |
| JP | 2011-078442 A | 4/2011 |
| WO | 2008032746 A1 | 3/2008 |
| WO | 2008/114268 A2 | 9/2008 |
| WO | 2008/133388 A1 | 11/2008 |
| WO | 2009/089253 A1 | 7/2009 |

OTHER PUBLICATIONS

Chinese Office Action Search Report application No. 201180012247X dated May 6, 2014.

Japanese Office Action Notice of Reasons for Rejection application No. 2012-509472 dated Apr. 25, 2014.

European Search Report application No. 11765532.4 dated Nov. 20, 2013.

* cited by examiner

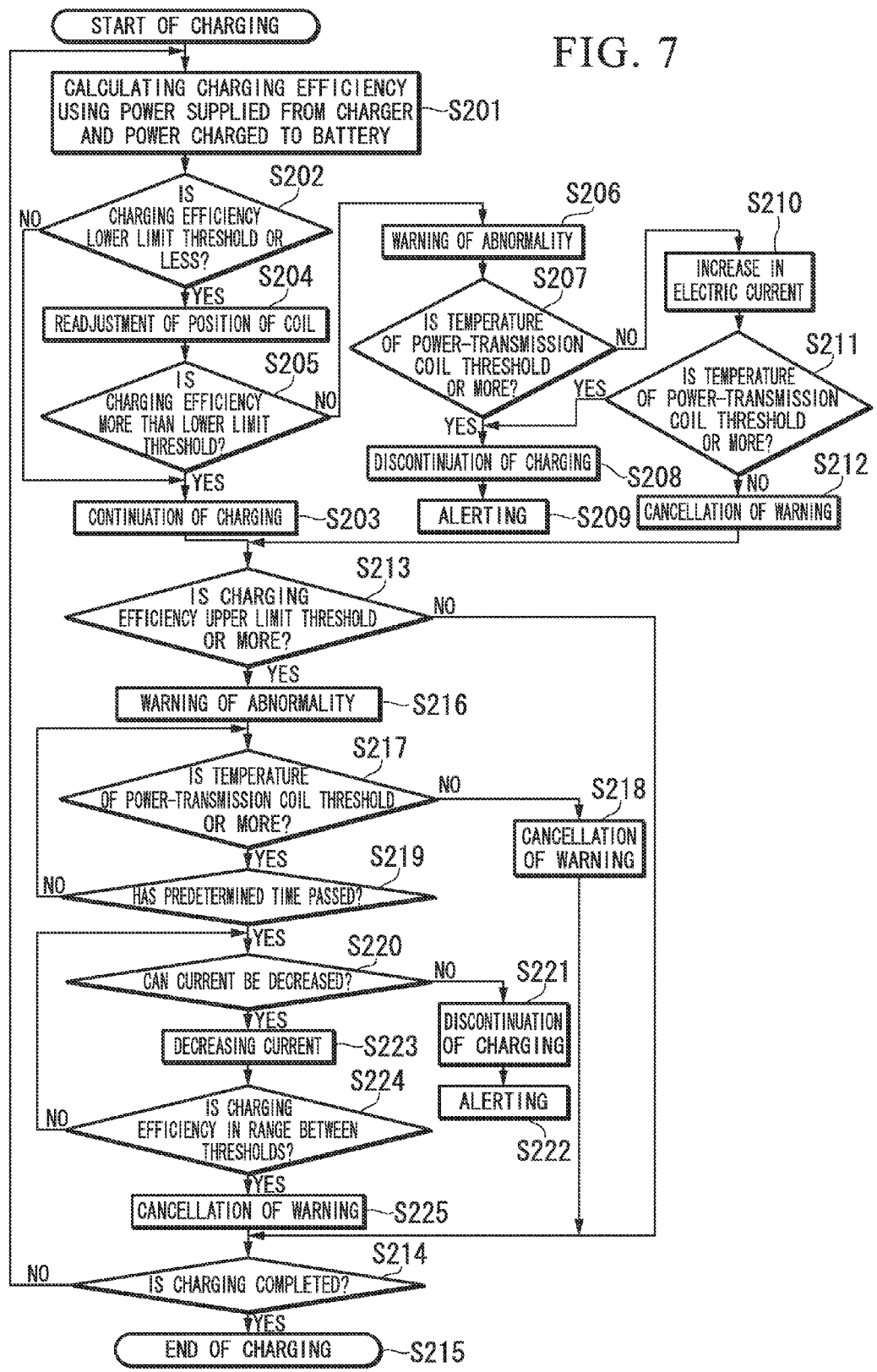

NON-CONTACT CHARGING SYSTEM

FIELD OF THE INVENTION

The present invention relates to a non-contact charging system, for example, used in an electric vehicle.

Priority is claimed on Japanese Patent Application No. 2010-81401, filed Mar. 31, 2010, the content of which is incorporated herein by reference.

DESCRIPTION OF RELATED ART

For example, as devices that charge batteries installed to electric vehicles, non-contact power transmission devices (corresponding to a non-contact charging system according to the present invention) are used. The non-contact power transmission devices of such a type have a primary coil and a secondary coil that are formed by planar coils having planar shapes. In addition, a power transmission transformer is formed such that the primary coil and the secondary coil are electromagnetically coupled. Accordingly, the non-contact power transmission devices have an advantageous effect of having a high degree of freedom of the position at the time of electromagnetic coupling between both planar coils.

However, when the power transmission transformer is operated, it is necessary to adjust the position and the power transmission level at the time of electromagnetically coupling both planar coils, and it is preferable to be able to determine whether an object electromagnetically coupled with the primary coil is a magnetic foreign object such as metal other than the secondary coil. In addition, it is preferable to be able to determine whether a target to which power is transmitted is appropriate.

Accordingly, a non-contact power transmission device is disclosed which detects a magnetic foreign object for a primary coil configuring a power transmission transformer, detects that the positioning between the primary coil and the secondary coil is not appropriate, and informs a user of the detected information at the time of the detection through an indicator or the like (for example, see Patent Citation 1).

According to this device, as a method of detecting a magnetic foreign object, a method of detecting a change in the measured voltage is used. In addition, in a case where the measured voltage is equal to or higher than a predetermined value, a magnetic foreign object is determined to be present in the primary coil, and the operation of the power transmission transformer is stopped.

PATENT CITATION

[Patent Citation 1] Japanese Unexamined Patent Application, First Publication No. 2006-60909

SUMMARY OF THE INVENTION

Problems to be Solved by the Invention

However, according to the above-described conventional technique, the operation of the power transmission transformer is stopped when a magnetic foreign object is determined to be present in the primary coil, and, accordingly, there is a problem in that charging is not completed within a target charging time, for example, in a case where the measured voltage is equal to or greater than a predetermined value due to the magnetic foreign object.

Thus, in view of the above-described situations, the present invention provides a non-contact charging system that can complete charging within a target charging time by proper charging without being influenced by a magnetic foreign object.

Methods for Solving the Problem

In order to solve the above-described problems, the following configuration is employed in the present invention.

(1) A non-contact charging system according to an aspect of the present invention includes: a power transmission device that includes a primary coil supplying electric power through electromagnetic induction; a power reception device that includes a secondary coil receiving electric power by being electromagnetically coupled with the power transmission device; and a control device that determines charging efficiency from the primary coil to the secondary coil and changes the current supplied to the primary coil in accordance with the charging efficiency.

(2) The non-contact charging system according to the above (1) may further include a first temperature detecting device that determines the temperature of the primary coil.

(3) In the non-contact charging system according to the above (2), a threshold of a heat-resistant temperature of the primary coil may be stored in the control device, and, in a case where the charging efficiency is equal to or less than a lower limit value, the control device may increase the current supplied to the primary coil while maintaining the temperature of the primary coil to be less than the threshold.

(4) In the non-contact charging system according to the above (2) or (3), a threshold of a heat-resistant temperature of the primary coil may be stored in the control device, and, in a case where the charging efficiency is equal to or higher than an upper limit value, the control device may decrease the current supplied to the primary coil while maintaining the temperature of the primary coil to be less than the threshold.

(5) In the non-contact charging system according to the above (3), in a case where the temperature of the primary coil is equal to or higher than the threshold, the control device may stop supplying the current to the primary coil.

(6) In the non-contact charging system according to the above (3), in a case where the temperature of the primary coil is equal to or higher than the threshold, the control device may measure a time in which the temperature of the primary coil is equal to or higher than the threshold and stop supplying the current to the primary coil when the measured time passes a predetermined time.

(7) The non-contact charging system according to the above (1) or (2) may further include a second temperature detecting device that determines the temperature of the secondary coil.

(8) In the non-contact charging system according to the above (7), a threshold of a heat-resistant temperature of the secondary coil may be stored in the control device, and, in a case where the charging efficiency is equal to or higher than an upper limit value, the control device may decrease the current supplied to the primary coil while maintaining the temperature of the secondary coil to be less than the threshold.

(9) The non-contact charging system according to the above (1) or (2) may further include a driving device that moves the power transmission device.

(10) In the non-contact charging system according to the above (9), in a case where the charging efficiency is equal to or less than a lower limit value, the driving device may move the power transmission device to a position at which the charging efficiency is a maximum.

(11) The non-contact charging system according to the above (1) or (2) may further include an alerting device that alerts stopping supplying the current to the primary coil.

Effects of the Invention

According to the non-contact charging system according to the above (1), it is determined based on a change in the charging efficiency whether a magnetic foreign object is present between the primary coil and the secondary coil, and when the charging efficiency increases or decreases due to the magnetic foreign object, the current supplied to the primary coil is changed, whereby a current flowing through the second coil side can be changed. Accordingly, it is possible to complete the charging within a target charging time.

According to the non-contact charging system according to the above (2), a damage to the power transmission device can be prevented by determining the temperature of the primary coil.

According to the non-contact charging system according to the above (3), in a case where the charging efficiency is equal to or less than the lower limit value, the amount of current flowing through the secondary coil is changed such that the temperature of the primary coil does not exceed the heat-resistant temperature, and accordingly, charging can be completed within the target charging time. Therefore, even in a case where a magnetic foreign object comes near the primary coil or the secondary coil so as to decrease the charging efficiency, charging can be reliably completed within the target charging time.

According to the non-contact charging system according to the above (4), in a case where the charging efficiency is improved more than necessary, the charging operation can be continued while suppressing the temperature of the primary coil to be less than the heat-resistant temperature. Therefore, even in a case where a magnetic foreign object comes between the primary coil and the secondary coil, and the charging efficiency is improved more than necessary, charging can be completed in accordance with the target charging time.

According to the non-contact charging system according to the above (5), an overcurrent in the primary coil and the secondary coil can be prevented. Therefore, damage to the power transmission device and the power reception device due to overcurrent can be reliably prevented.

According to the non-contact charging system according to (6), an erroneous determination on whether an overcurrent is supplied to the primary coil can be prevented. For example, in a case where a magnetic foreign object passes between the primary coil and the secondary coil due to a wind or the like, and the temperature of the primary coil is temporarily equal to or higher than the threshold, it is not determined that an overcurrent is continuously supplied to the primary coil, and the supply of the current to the primary coil is continued. Therefore, the charging can be efficiently completed without stopping the charging operation.

According to the non-contact charging system according to (7), damage in the power transmission device and the power reception device can be prevented by determining the temperature of the secondary coil.

According to the non-contact charging system according to (8), in a case where the charging efficiency is improved more than necessary, the charging operation can be continued while suppressing the temperature of the primary coil and the temperature of the secondary coil to be less than the heat-resistant temperature. Therefore, even in a case where a magnetic foreign object comes between the primary coil and the secondary coil, and the charging efficiency is improved more than necessary, charging can be completed in accordance with the target charging time.

According to the non-contact charging system according to the above (9), the position of the primary coil can be moved to an appropriate position. Therefore, in a case where a predetermined current flows through the primary coil, the charging operation can be performed most efficiently.

According to the non-contact charging system according to the above (10), the current supplied to the primary coil can be prevented from changing due to the change in the charging efficiency that is caused by a deviation of the opposing position between the primary coil and the secondary coil. Therefore, for example, when the charging efficiency decreases due to the deviation of the opposing position between the primary coil and the secondary coil, the supply of an overcurrent to the primary coil can be reliably prevented.

According to the non-contact charging system according to the above (11), a user can be notified of the determination result made by the control device. Therefore, an abnormality during the charging operation can be recognized by the user, and the user can perform an appropriate treatment such as an operation of removing a magnetic foreign object added between the primary coil and the secondary coil.

BRIEF DESCRIPTION OF THE DRAWINGS

FIG. 7 is a flowchart that illustrates the sequence of adjusting a high-frequency current that is applied to the primary coil according to the embodiment.

DETAILED DESCRIPTION OF THE INVENTION (Non-Contact Charging System)

An embodiment of the present invention will be described with reference to the drawings.

Figure 1:
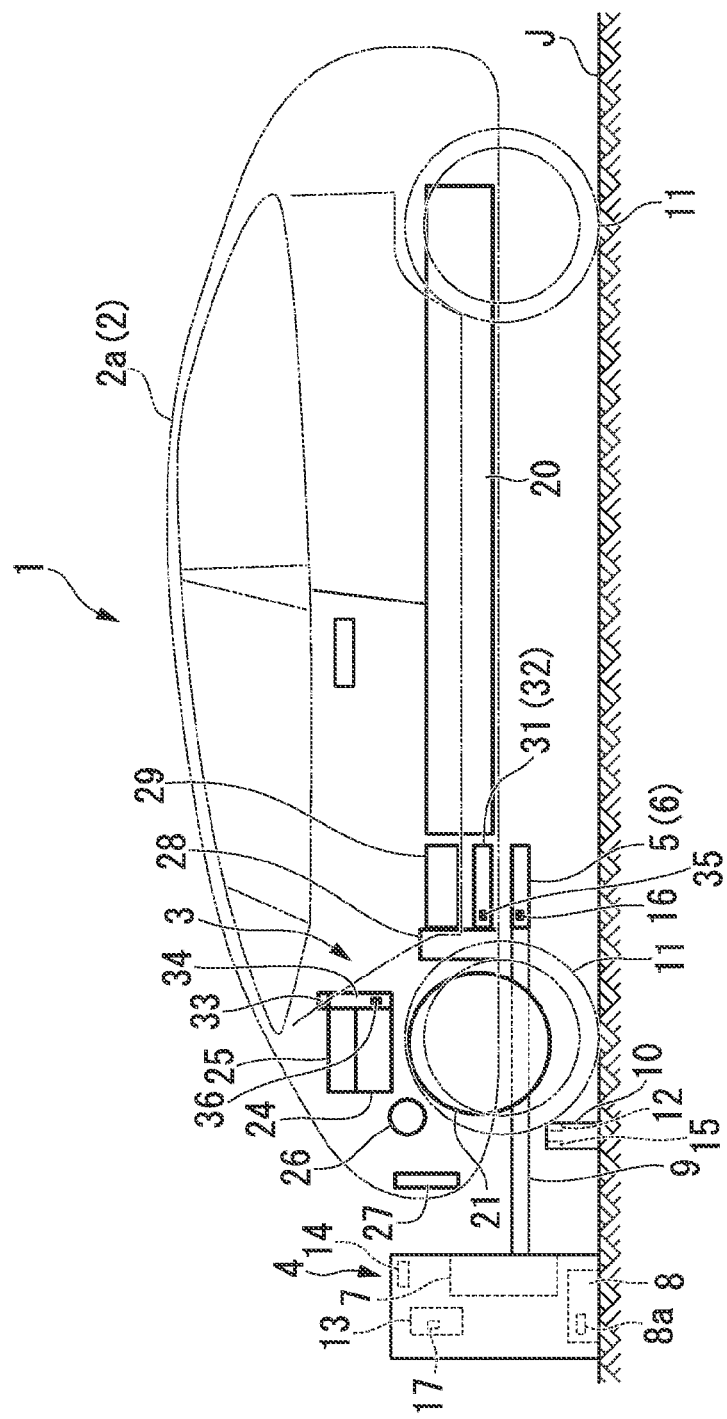
FIG. 1 is a schematic diagram of a non-contact charging system, viewed from a lateral face side of an electric vehicle, according to an embodiment of the present invention.
Figure 2:
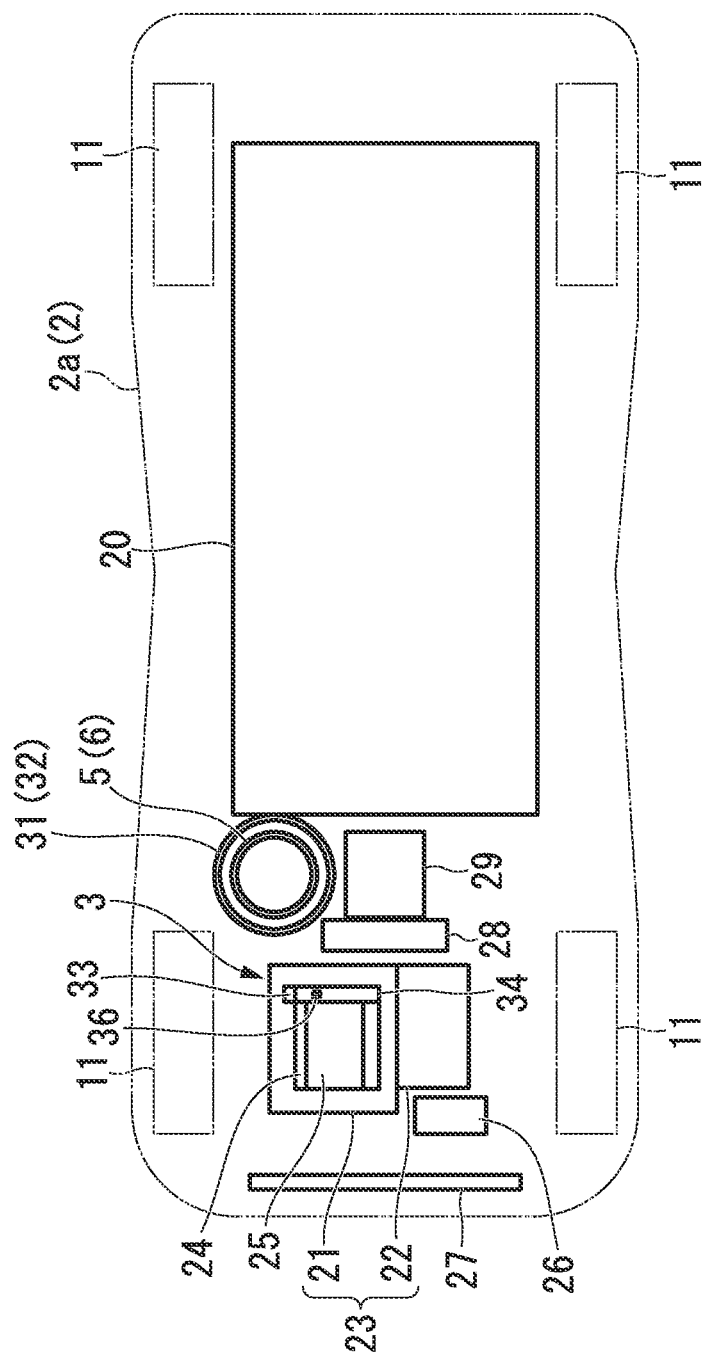
FIG. 2 is a schematic diagram of the non-contact charging system, viewed from the upper side of the electric vehicle, according to the embodiment.

FIG. 1 is a schematic diagram of a non-contact charging system 1, viewed from a lateral face side of an electric vehicle 2. FIG. 2 is a schematic diagram of the non-contact charging system 1, viewed from the upper side of the electric vehicle 2. In the description presented below, there are cases where the advancing direction of the electric vehicle 2 is referred to as a forward direction, the retreating direction is referred to as a backward direction, and the widthwise direction (width direction) of the electric vehicle 2 is referred to as a leftward/rightward direction. In addition, a part of FIG. 1 is omitted in FIG. 2.

As illustrated in FIGS. 1 and 2, the non-contact charging system 1 is a system that charges a battery 20, for example, installed to an electric vehicle 2 or the like. This non-contact charging system includes a vehicle-side charging device 3 that is installed to the inside of the electric vehicle 2 and a parking facility-side charging device 4 that is present on the outside of the electric vehicle 2 and, for example, is installed in a facility such as a parking lot.

The electric vehicle 2 includes: a motor unit 23; an inverter 24; a VCU (a voltage control unit or a converter) 25; an EWP (electric water pump) 26; a radiator 27; a down converter (converter) 28; a charger 29; and a battery 20. Here, the motor unit 23 houses power transmission units such as a motor 21, reduction gears 22, and the like. In addition, the inverter 24 and the VCU 25 are cooled by a coolant that is cooled by the radiator 27 and is circulated by the EWP 26 by driving the motor 21. In addition, the down converter 28 steps down a voltage that is output from a driving system and supplies the stepped-down voltage to the battery 20 that is arranged on the floor of the vehicle body 2a of the electric vehicle 2. The charger 29 is used as a voltage converter when the battery 20 is charged by using the non-contact charging system 1.

(Vehicle-Side Charging Device)

The vehicle-side charging device 3 includes: a power reception device 32 that has a secondary coil (power-reception coil) 31 receiving power supplied from the parking facility-side charging device 4; a vehicle-side transmission/reception unit 33 that transmits or receives information to or from the parking facility-side charging device 4; a temperature sensor (second temperature detecting unit) 35 for detecting the temperature of secondary coil 31; and a control device 34 that performs various controls of the non-contact charging system 1.

The secondary coil 31 is a planar coil that is formed in a circular shape in the plan view, for example, by winding a single cable (wire), which is coated so as to be insulated, in a spiral shape on the same plane. When the secondary coil 31 is electromagnetically coupled with the primary coil (power transmission coil) 5, which is disposed in the parking facility-side charging device 4, to be described later, it can receive power that is supplied from the primary coil 5.

The control device 34 detects electric power (charging energy) that is received by the secondary coil 31. In addition, the control device 34 acquires information of electric power (discharging energy) that is output by the primary coil 5 from the parking facility-side charging device 4 through the vehicle-side transmission/reception unit 33 and calculates (detects) the charging efficiency (the ratio of the charging energy (power charged to the battery) to the discharging energy (power supplied to the charger)) from the primary coil 5 to the secondary coil 31.

In addition, in the control device 34, a lower limit and an upper limit of the charging efficiency are set as a lower limit threshold and an upper limit threshold. Furthermore, the control device 34 determines whether or not a calculated charging efficiency is within a range (hereinafter, referred to as a threshold range) of the lower limit threshold to the upper limit threshold. Thereafter, the control device 34 transmits the determination result as a signal to the parking facility-side charging device 4 through the vehicle-side transmission/reception unit 33.

Furthermore, the control device 34 includes a timer 36 that measures a time. When the counted value of the timer 36 arrives at a predetermined value, the control device 34 transmits a signal to the parking facility-side charging device 4 through the vehicle-side transmission/reception unit 33. In this control device 34, a target charging time is set in advance. In other words, the control device 34 determines the charging efficiency within the threshold range such that charging is completed in the target charging time while referring to the counted value of the timer 36.

In addition, in an operation of charging the battery 20, it is preferable to perform charging in a time that is the same as the target charging time set in advance. For example, in a case where the charging of the batter 20 is completed in a time that is extremely shorter than the target charging time, the battery 20 is left as it is after the completion of charging, whereby the battery 20 is degraded.

(Parking Facility-Side Charging Device)

The parking facility-side charging device 4 includes: a power transmission device 6 that includes a primary coil 5 supplying electric power to the vehicle-side charging device 3; a driving device 7 that moves the power transmission device 6; a range specifying device 8 that specifies the movement range W (see FIG. 4A) of the primary coil 5; a control unit (control device) 13 that controls the driving device 7 and the range specifying device 8; and a parking facility-side transmission/reception unit 14 that transmits or receives information to or from the vehicle-side charging device 3.

The primary coil 5 is a planar coil that is formed in a circular shape in the plan view, for example, by winding a single cable (wire), which is coated so as to be insulated, in a spiral shape on the same plane. The primary coil 5 is applied with a predetermined high-frequency current and generates a magnetic field.

In addition, in the power transmission device 6, a temperature sensor (first temperature detecting unit) 16 that detects the temperature of the primary coil 5 is arranged. The detection result acquired by the temperature sensor 16 is output to the control unit 13 as a signal.

The driving device 7 includes an arm unit 9 that can support the power transmission device 6 at one end. The arm unit 9 is configured to be expandable or contractible in the forward/backward direction (advancing direction) of the electric vehicle 2, for example, in a telescope shape, and is driven by the driving device 7. In addition, the arm unit 9 can be moved in the leftward/rightward direction of the electric vehicle 2. Accordingly, the power transmission device 6 can be moved in the forward/backward direction and in the leftward/rightward direction between the ground J and the vehicle body 2a.

In addition, the driving device 7 is not necessarily limited to the configuration including the arm unit 9 having a telescope shape and may be configured such that the power transmission device 6 can be moved in the forward/backward direction and in the leftward/rightward direction.

The parking facility-side charging device 4 includes wheel stoppers 10 that can detect the width of the electric vehicle 2 at a position located far from the range specifying device 8. The wheel stopper 10 regulates the movement of the electric vehicle 2, and, in the wheel stopper 10, a tire detecting sensor 12 is arranged in a portion with which a tire 11 of the electric vehicle 2 is brought into contact. This tire detecting sensor 12 detects the position of the tire 11. A plurality of the tire detecting sensors 12 is arranged at positions corresponding to the left and right tires 11 so as to be used for the vehicle types of various vehicles 2. For example, when the left and right tires 11 of the front wheels are brought into contact with the wheel stoppers 10, the distance between the left and right tires 11 of the front wheels is detected by the tire detecting sensor 12.

As the tire detecting sensors 12, various sensors such as contact-type sensors, for example, limit switches or the like, photoelectric sensors, or touch panels can be used.

In addition, in the wheel stopper 10, a transmission unit 15 that transmits a signal to the calculation unit 8a arranged in the range specifying device 8 is arranged. The detection result acquired by the tire detecting sensor 12 is output to the calculation unit 8a as a signal through the transmission unit 15 and parking facility-side transmission/reception unit 14.

The calculation unit 8a is arranged inside the range specifying device 8 so as to calculate the width of the electric vehicle 2 based on the detection result acquired by the tire detecting sensor 12. In other words, the calculation unit 8a calculates the width of the vehicle body 2a based on a signal input from the tire detecting sensor 12. In addition, the calculation unit 8a calculates the length of the vehicle body 2a in the forward/backward direction based on the calculated width of the vehicle body 2a.

As the length of the vehicle body 2a in the forward/backward direction, for example, a maximum legal length that is determined based on the width of the vehicle body 2a can be used. In addition, it may be configured such that, for example, a table in which the width of the vehicle body 2a and the length of the vehicle body 2a are associated with each other is arranged in the calculation unit 8a, and the length of the vehicle body 2a in the forward/backward direction may be acquired based on the width of the vehicle body 2a that is calculated by referring to the table.

Other than that, it may be configured such that vehicle type information of the electric vehicle 2 is stored in the control device 34 of the vehicle-side charging device 3 in advance, and the vehicle type information is output to the calculation unit 8a through the parking facility-side transmission/reception unit 14. In such a case, the calculation unit 8a can acquire length data of the vehicle body 2a in the forward/backward direction based on the input vehicle type information.

Furthermore, the calculation unit 8a specifies the movement range W (see FIG. 4A) of the primary coil 5 based on the width and the length of the vehicle body 2a which have been calculated.

In addition, in a case where the length data of the vehicle body 2a in the forward/backward direction is acquired based on the vehicle type information of the electric vehicle 2 that is acquired from the vehicle-side charging device 3, width data of the vehicle body 2a can be acquired based on the vehicle type information.

However, when the movement range W of the primary coil 5 is determined, it is necessary to recognize positions of the tires 11 of the electric vehicle 2 with which the wheel stoppers 10 are brought into contact. Accordingly, it is preferable that the width of the vehicle body 2a is calculated based on an output signal output from the tire detecting sensor 12.

In the control unit 13, the heat-resistant temperature of the primary coil 5 is set as a threshold. This control unit 13 determines whether or not the temperature of the primary coil 5, which is input from the temperature sensor 16, is equal to or higher than the threshold. The value of a high-frequency current applied to the primary coil 5 is determined based on the determination result and the calculation result (determination result) of the charging efficiency that is input from the control device 34 of the vehicle-side charging device 3. In addition, as will be described later, in order to determine the value of the high-frequency current applied to the primary coil 5, the result of the determination on whether the temperature of the secondary coil 31, which is input from the control device 34 of the vehicle-side charging device 3, is equal to or higher than the threshold can also be used.

In addition, the control unit 13 includes an alarm device (alerting device) 17. In a case where the charging efficiency calculated by the control device 34 of the vehicle-side charging device 3 is not within the threshold, the alarm device 17 transmits a warning to a user through the parking facility-side transmission/reception unit 14. Specifically, for example, a warning is transmitted to a user's cellular phone or the like, and the user can recognize the abnormality of the non-contact charging system 1, even when the user is located at a position far from the electric vehicle 2.

Furthermore, the control unit 13 outputs a signal to the driving device 7 based on the movement range W that is specified by the calculation unit 8a of the range specifying device 8 and controls the movement range of the primary coil 5. In addition, the control unit 13 transmits the power (discharging energy), which is output by the primary coil 5, as a signal to the control device 34 of the vehicle-side charging device 3 through the parking facility-side transmission/reception unit 14.

In addition, the result of the determination on whether or not the charging efficiency calculated by the control device 34 of the vehicle-side charging device 3 exceeds the threshold is input to the control unit 13 as a signal through the parking facility-side transmission/reception unit 14.

Here, the control device 34 of the vehicle-side charging device 3 determines a maximum value of the charging efficiency within the movement range W of the primary coil 5 that is specified by the range specifying device 8 and transmits the determination result as a signal to the control unit 13 of the parking facility-side charging device 4.

The control unit 13 transmits a signal to the driving device 7 based on the determination result that is output from the control device 34 of the vehicle-side charging device 3, adjusts the position of the primary coil 5 so as to maximize the charging efficiency, and moves the primary coil 5 to the specified position. In addition, the primary coil 5 and the secondary coil 31 are electromagnetically coupled so as to charge the battery 20 of the electric vehicle 2.

(Sequence of Adjusting Position of Primary Coil)

More specifically, the sequence of adjusting the position of the primary coil 5 will be described based on FIGS. 3 to 5C.

Figure 3:
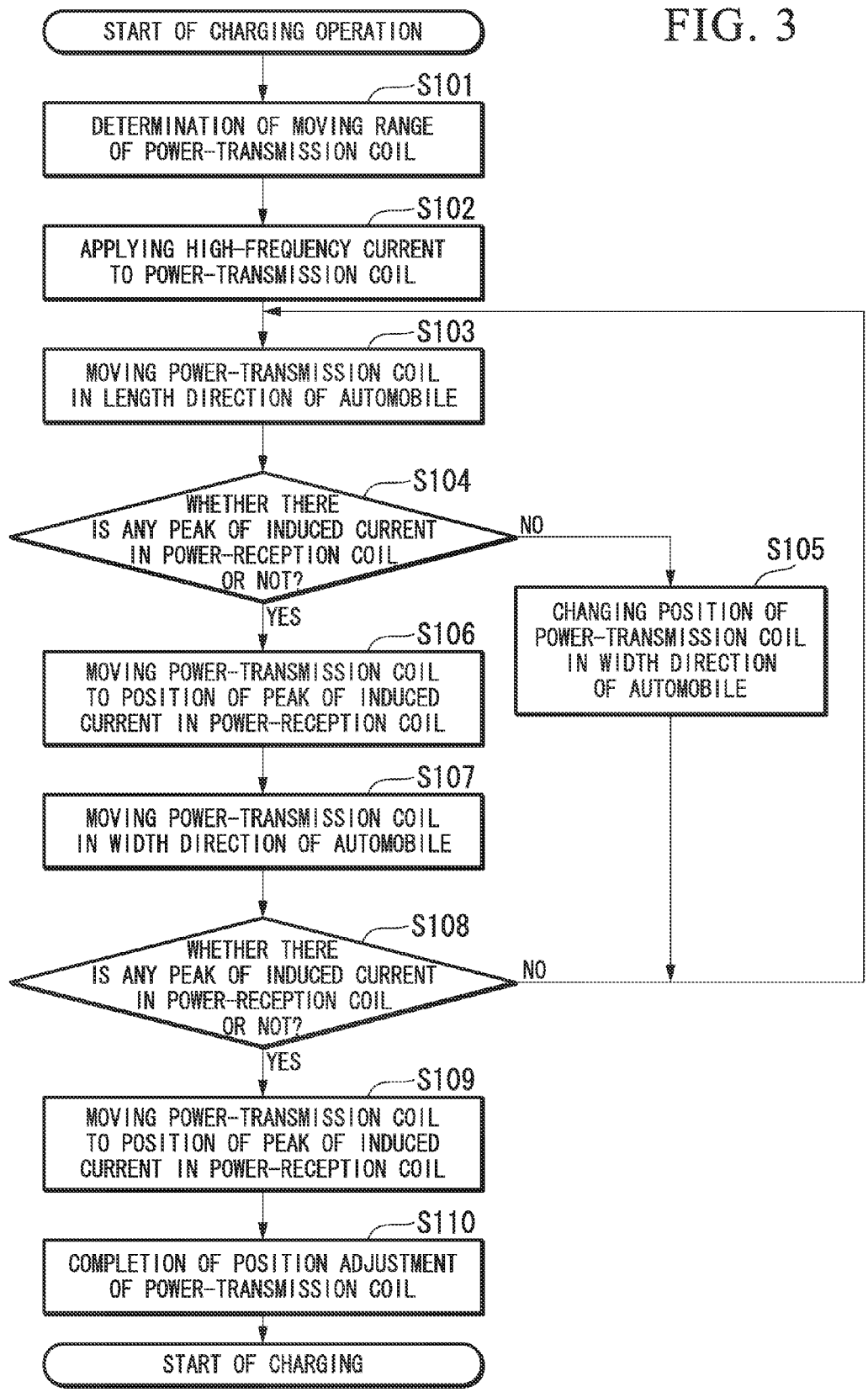
FIG. 3 is a flowchart that illustrates the sequence of adjusting the position of a primary coil according to the embodiment.

FIG. 3 is a flowchart that illustrates the sequence of adjusting the position of the primary coil 5. FIGS. 4A to 4F are schematic diagrams illustrating the operation of adjusting the position of the primary coil 5 and illustrate the state in each step.

Figure 5A:
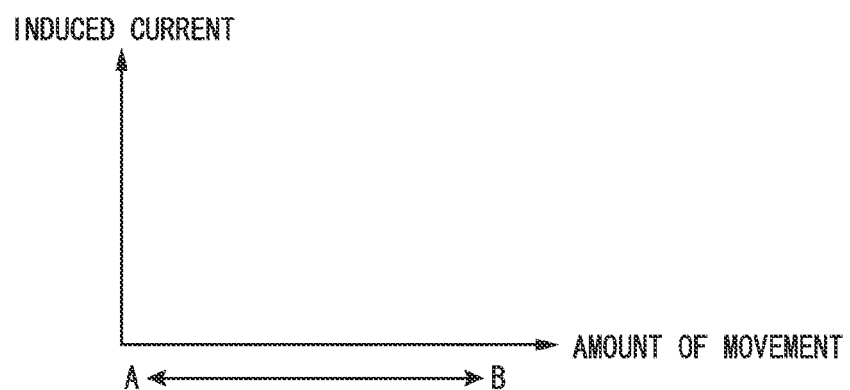
FIG. 5A is a graph that schematically illustrates the relationship between the amount of movement of the primary coil 5 and the induction current of the secondary coil according to the embodiment in a case where the induction current is not detected.
Figure 5B:
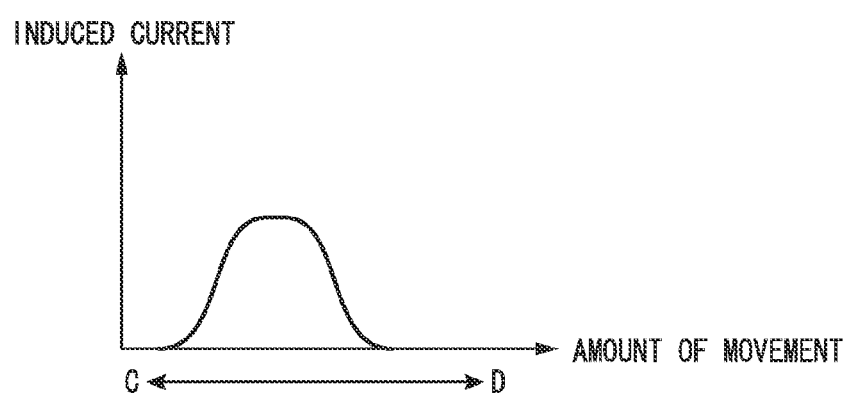
FIG. 5B is a graph that schematically illustrates the relationship between the amount of movement of the primary coil 5 and the induction current of the secondary coil according to the embodiment in a case where the induction current is detected.
Figure 5C:
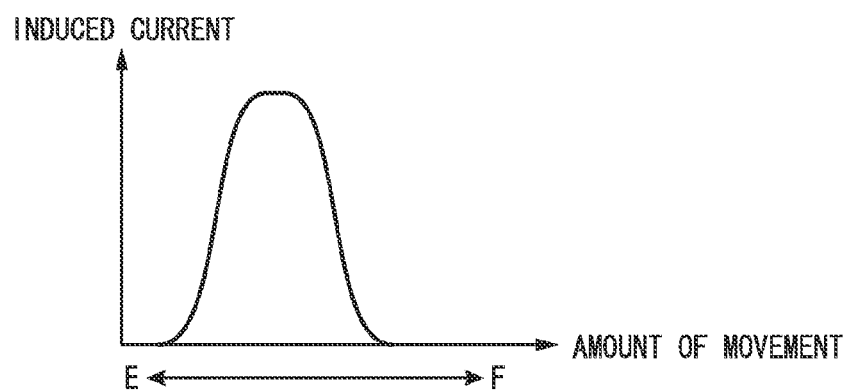
FIG. 5C is a graph that schematically illustrates the relationship between the amount of movement of the primary coil 5 and the induction current of the secondary coil according to the embodiment in a case where a maximum value of the induction current is detected.

FIGS. 5A to 5C are graphs that schematically illustrate the relationships between the amount of movement of the primary coil 5 and the induction current (induced current) of the secondary coil 31, and in each figure, a change in the induction current in each step is illustrated. In FIGS. 5A to 5C, the vertical axis represents the induction current received by the secondary coil 31, and the horizontal axis is the amount of movement of the primary coil 5.

Figure 4A:
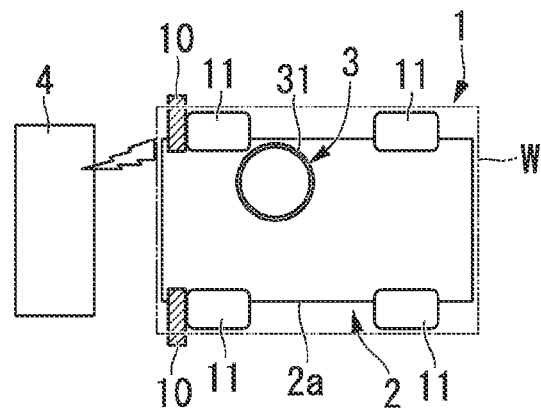
FIG. 4A is an explanatory diagram that illustrates the operation of adjusting the position of the primary coil (Step 101) according to the embodiment.

First, as illustrated in FIGS. 3 and 4A, for example, an electric vehicle 2 is allowed to enter a garage to which the non-contact charging system 1 is installed, and the electric vehicle 2 is stopped at a position at which tires 11 are brought into contact with the wheel stoppers 10. At this time, for example, in a case where the electric vehicle 2 enters the garage while forwardly moving, the positions of the left and right tires 11 of the front wheels are detected by the tire detecting sensors 12 arranged in the wheel stoppers 10.

When the positions of the tire 11 are detected, the movement range W of the primary coil 5 is specified by the calculation unit 8a of the range specifying device 8 (Step S101 illustrated in FIG. 3).

Subsequently, the parking facility-side charging device 4 applies a high-frequency current to the primary coil 5 (Step S102 illustrated in FIG. 3).

Figure 4B:
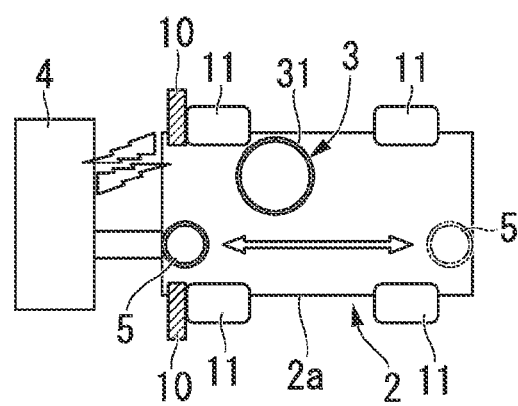
FIG. 4B is an explanatory diagram that illustrates the operation of adjusting the position of the primary coil (Step S103 in a case where an induction current of a secondary coil is not detected) according to the embodiment.

Next, by driving the driving device 7, the primary coil 5 is moved in the forward/backward direction (longitudinal direction, length direction) of the electric vehicle 2, for example, by a distance corresponding to one line between two points (a position (point A) of the primary coil 5 that is denoted by a solid line and a position (point B) of the primary coil 5 that is denoted by a dashed-two dotted line) illustrated in FIG. 4B (Step S103 illustrated in FIG. 3).

Here, it is preferable that the start position of the primary coil 5 in the forward/backward direction is set to the side end (the left-side end in FIG. 4B) of the wheel stopper 10 in the movement range W. In such a case, when the primary coil 5 is moved over one line, the primary coil 5 does not need to reciprocate. In other words, one line of the primary coil 5 can be scanned in the forward path or the backward path.

In addition, it is preferable that the start position of the primary coil 5 in the leftward/rightward direction is set to any one end of the right-side end (the upper end in FIG. 4B) or the lower end (the lower end in FIG. 4B) of the movement range W. In such a case, the movement in the leftward/rightward direction can be suppressed to be the minimum.

Subsequently, in Step S103, while the primary coil 5 is moved in the forward/backward direction of the electric vehicle 2, it is determined whether or not an induction current is generated in the secondary coil 31 in accordance with electromagnetic coupling between the primary coil 5 and the secondary coil 31 (Step S104 illustrated in FIG. 3).

In a case where the determination is "No" in Step S104, in other words, in a case where the distance between the primary coil 5 and the secondary coil 31 is a distance for which electromagnetic coupling cannot be made, as illustrated in FIG. 5A, an induction current is not generated at all in the secondary coil 31 between point A and point B, and an induction current is not detected by the control device 34 of the vehicle-side charging device 3. Accordingly, the position of the arm unit 9 in the leftward/rightward direction is changed to the second line (next line) by the driving device 7 (Step S105 illustrated in FIG. 3).

Returning to Step S103 again, the primary coil 5 is moved along the forward/backward direction of the electric vehicle 2. At this time, in a case where movement direction of the primary coil 5 is a direction from the front side to the back side of the vehicle body 2a in the previous step of Step S103, the movement direction of the primary coil 5 in this Step S103 is a direction from the back side to the front side of the vehicle body 2a. The steps are repeatedly performed while the moving line of the primary coil 5 is changed.

In addition, it is preferable that a gap between lines, in other words, the amount of shift of the arm unit 9 for each time in the leftward/rightward direction in Step S105, for example, is set to be about 1 cm.

In a case where the determination is "Yes" in Step S104, in other words, in a case where the distance between the primary coil 5 and the secondary coil 31 is a distance for which electromagnetic coupling can be made, as illustrated in FIG. 5B, an induction current is generated in the secondary coil 31, and the induction current is detected by the control device 34 of the vehicle-side charging device 3.

Figure 4C:
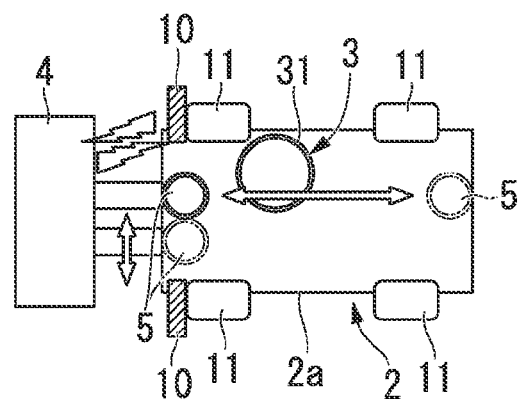
FIG. 4C is an explanatory diagram that illustrates the operation of adjusting the position of the primary coil (Step S103 in a case where an induction current of the secondary coil is detected) according to the embodiment.
Figure 4D:
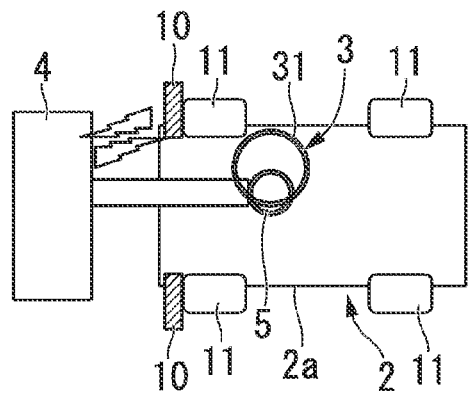
FIG. 4D is an explanatory diagram of the operation of adjusting the position of the primary coil (Step S106) according to the embodiment.

At this time, by moving the primary coil 5 over the entire forward/backward direction within the movement range W, in other words, for example, by moving the primary coil 5 from the position (point C) of the primary coil 5 that is denoted by a solid line in FIG. 4C to the position (point D) of the primary coil 5 that is denoted by a dashed-two dotted line, a peak value (peak) of the induction current on one line can be acquired.

The control device 34 determines the peak value of the induction current as an optimal position of the primary coil 5 in the forward/backward direction and transmits the determination result as a signal to the control unit 13 of the parking facility-side charging device 4. In addition, this control unit 13 outputs a signal to the driving device 7 based on the output signal output from the control device 34. The driving device 7 moves the primary coil 5 to the optimal position in the forward/backward direction at which the peak value (the peak or the top) of the induction current is detected based on the signal output from the control unit 13 (see Step S106 illustrated in FIG. 3 and FIG. 4D).

Figure 4E:
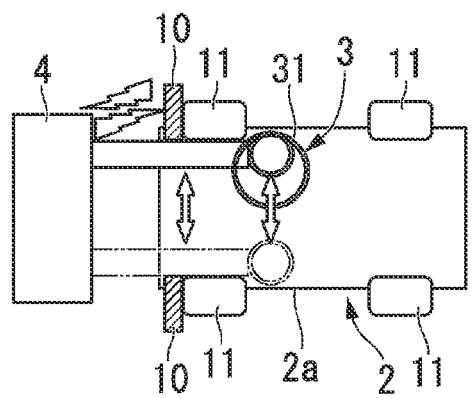
FIG. 4E is an explanatory diagram of the operation of adjusting the position of the primary coil (Step S107) according to the embodiment.
Figure 4F:
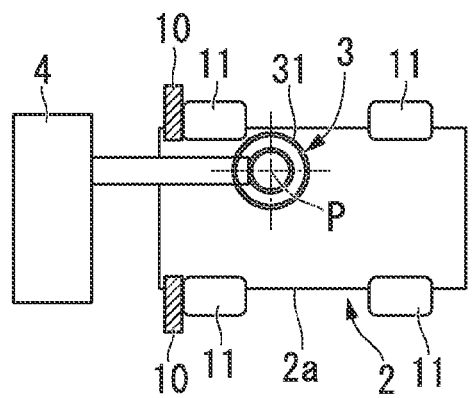
FIG. 4F is an explanatory diagram of the operation of adjusting the position of the primary coil (Step S109) according to the embodiment.

After the optimal position of the primary coil 5 in the forward/backward direction is determined, the primary coil 5 is moved to the left/right side by the driving device 7 (See Step S107 illustrated in FIG. 3 and FIG. 4E).

Then, in Step S107, while the primary coil 5 is moved along the leftward/rightward direction of the electric vehicle 2, it is determined whether or not there is a peak value in the induction current flowing through the secondary coil 31 (Step S108 illustrated in FIG. 3).

Here, in a case where the determination in Step S108 is "No", in other words, in a case where the peak value of the induction current flowing through the secondary coil 31 does not change, the determination made previously in Step S104 or S106 is determined to be an erroneous determination, and the process is returned to Step S103. Thereafter, the primary coil 5 is moved along the forward/backward direction.

On the other hand, in a case where the determination made in Step S108 is "Yes", in other words, as illustrated in FIGS. 4E and 5C, for example, in a case where the primary coil is moved in the leftward/rightward direction from point E (the position of the primary coil 5 denoted by a sold line in FIG. 4E) to point F (the position of the primary coil 5 denoted by a dashed-two dotted line in FIG. 4E), and the peak value of the induction current flowing through the secondary coil 31 is detected, the control device 34 determines the peak value as an optimal position of the primary coil 5 in the leftward/rightward direction.

In other words, by determining the optimal position of the primary coil 5 in the forward/backward direction and the optimal position thereof in the leftward/rightward direction, the optimal position P at which the maximum value of the induction current flowing through the secondary coil 31 is detected is determined. This optimal position P is determined as a position at which a charging operation can be performed most efficiently.

In addition, the control device 34 transmits the determination result as a signal to the control unit 13 of the parking facility-side charging device 4. The control unit 13 outputs a signal to the driving device 7 based on the output signal output from the control device 34. The driving device 7 moves the primary coil 5 to the optimal position P at which the peak value (the park or the top) of the induction current is detected based on the signal output from the control unit 13 (see Step S109 in FIG. 3 and FIG. 4F).

Accordingly, the adjustment of the position of the primary coil 5 is completed (Step S110 in FIG. 3).

When the adjustment of the position of the primary coil 5 is completed as above, a predetermined high-frequency current is applied to the primary coil 5 so as to start charging the battery 20 of the electric vehicle 2. At this time, by the down converter 28 and the charger 29 that are installed to the electric vehicle 2, the induction current generated in the secondary coil 31 is rectified and then is electrically stored in the battery 20.

Here, after the charging of the battery 20 is started, the control unit 13 changes the value of the high-frequency current that is applied to the primary coil 5 in accordance with the situation. For example, the control unit 13 starts charging the battery 20 and then changes the value of the high-frequency current that is applied to the primary coil 5 based on the results of the determinations of the temperature of the primary coil 5 detected by the temperature sensor 16 installed in the power transmission device 6 and the temperature of the secondary coil 31 that is input from the control device 34 of vehicle-side charging device 3 and the result of the determination on whether or not the charging efficiency exceeds the threshold.

(Method of Adjusting Value of High-Frequency Current)

The method of adjusting the value of the high-frequency current that is applied to the primary coil 5 will be described in more detail with reference to FIGS. 6A to 7.

Here, first, based on FIGS. 6A to 6D, the change in the state of magnetic fluxes that are generated between the primary coil 5 and the secondary coil 31 will be described. FIGS. 6A to 6C are explanatory diagrams illustrating the states of magnetic fluxes that are generated between the primary coil 5 and the secondary coil 31. In addition, FIG. 6D is an explanatory diagram that illustrates the state of a case where normal magnetic fluxes are generated between the primary coil 5 and the secondary coil 31.

Figure 6A:
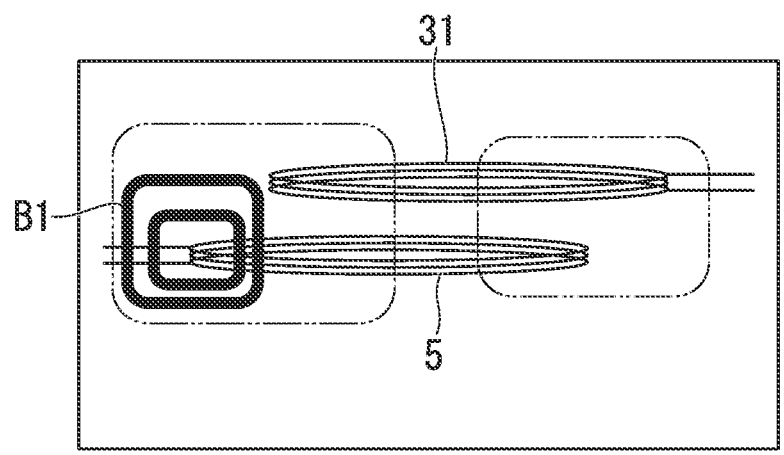
FIG. 6A illustrates the state of magnetic fluxes generated between the primary coil and the secondary coil according to the embodiment in a case where the relative position between the primary coil and the secondary coil is deviated.
Figure 6B:
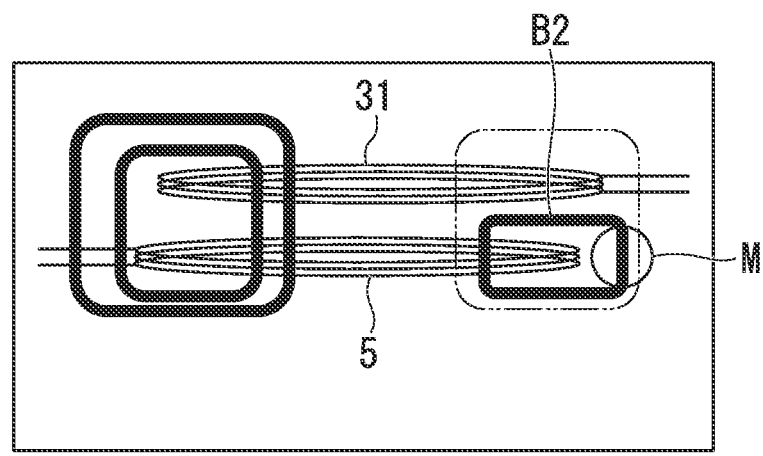
FIG. 6B illustrates the state of magnetic fluxes generated between the primary coil and the secondary coil according to the embodiment in a case where a magnetic foreign object is present near the primary coil.
Figure 6C:
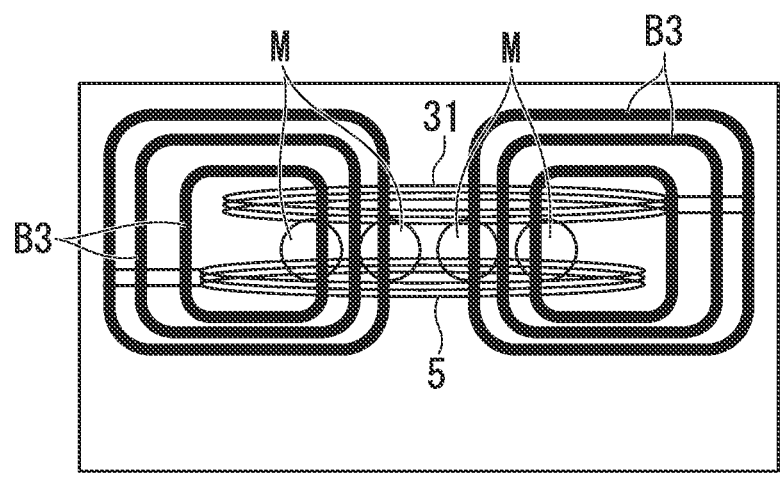
FIG. 6C illustrates the state of magnetic fluxes generated between the primary coil and the secondary coil according to the embodiment in a case where a magnetic foreign object is present between the primary coil and the secondary coil.
Figure 6D:
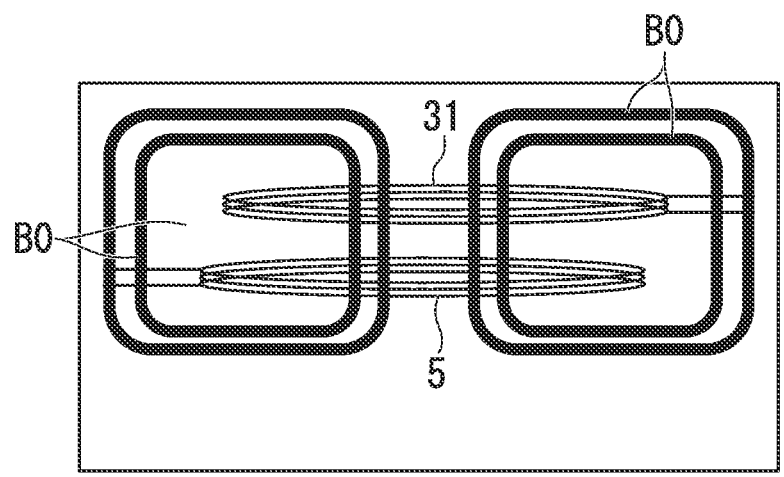
FIG. 6D illustrates the state of magnetic fluxes generated between the primary coil and the secondary coil according to the embodiment in a case where normal magnetic fluxes are generated.

First, as illustrated in FIG. 6D, in a case where the primary coil 5 and the secondary coil 31 are arranged at normal positions (optimal positions), there is no foreign material that occurs a problem between the primary coil 5 and the secondary coil 31, and normal electromagnetic induction occurs, normal magnetic fluxes B0 is generated between the primary coil 5 and the secondary coil 31.

In contrast to this, as illustrated in FIG. 6A, in a case where the relative position between the primary coil 5 and the secondary coil 31 is changed by a certain external force after the charging is started, some of magnetic fluxes generated by the primary coil 5 leak (leakage fluxes B1), and the flux linkage of the secondary coil 31 decreases. Accordingly, the charging efficiency decreases.

In addition, as illustrated in FIG. 6B, in a case where a magnetic foreign object M such as an iron scrap is present near the outer circumferential portion of the primary coil 5, the magnetic foreign object M is magnetized so as to form a magnetic field between the magnetic foreign object M and the primary coil 5. The leakage fluxes B2 are generated in accordance with the magnetic field, whereby the linkage flux of the secondary coil 31 decreases. Also in such a case, the charging efficiency decreases.

In a case where the relative position between the primary coil 5 and the secondary coil 31 is deviated (see FIG. 6A) and in a case where a magnetic foreign object M such as an iron scrap is present near the outer circumferential portion of the primary coil 5 (see FIG. 6B), desired charging efficiency can be acquired by increasing the high-frequency current applied to the primary coil 5.

However, the temperature of the primary coil 31 rises in accordance with an increase in the high-frequency current that is applied to the primary coil 31. Accordingly, the control unit 13 of the parking facility-side charging device 4 controls the value of the high-frequency current that is applied to the primary coil 31 based on the detection result acquired by the temperature sensor 16 (see FIG. 1) that is installed in the power transmission device 6.

On the other hand, as illustrated in FIG. 6C, in a case where a magnetic foreign object M is present between the primary coil 5 and the secondary coil 31, the magnetic foreign object M is magnetized, whereby the flux linkage B3 of the secondary coil 31 increases due to the magnetic fluxes generated by the magnetic foreign object M and the magnetic fluxes generated by the primary coil 5. Accordingly, the charging efficiency is improved more than necessary, whereby overcurrents are generated in the primary coil 5 and the secondary coil 31.

In such a case, the control unit 16 controls the value of the high-frequency current that is applied to the primary coil 31 based on the detection result acquired by the temperature sensor 16 (see FIG. 1) that is installed in the power transmission device 6 of the parking facility-side charging device 4.

The description will be presented in more detail with reference to FIG. 7. FIG. 7 is a flowchart that illustrates the sequence of adjusting the high-frequency current that is applied to the primary coil 5.

As illustrated in FIG. 7, after charging is started, the charging efficiency of the secondary coil 31 is calculated by the control device 34 of the vehicle-side charging device 3 (Step S201).

Next, it is determined whether or not the calculated charging efficiency is equal to or less than the lower limit threshold (Step S202). The result of the determination is transmitted as a signal from the control device 34 to the control unit 13 of parking facility-side charging device 4.

In a case where the determination made in Step S202 is "No", in other words, in a case where the charging efficiency is determined not be equal to or less than the lower limit threshold by the control device 34, the charging operation is continued (Step S203).

On the other hand, in a case where the determination made in Step S202 is "Yes", in other words, in a case where the charging efficiency is determined be equal to or less than the lower limit threshold by the control device 34, the charging operation is continued (Step S203), the position of the primary coil 5 is readjusted in consideration of a case where the relative position between the primary coil 5 and the secondary coil 31 is deviated (see FIG. 6A) (Step S204). Since a method of adjusting the primary coil 5 that is used in Step S204 is similar to that of the primary coil 5 that has been described with reference to FIGS. 3 to 5C described above, a description thereof will be omitted here.

After the position of the primary coil 5 is readjusted, it is determined whether or not the charging efficiency exceeds the lower limit threshold and is within the threshold range (Step S205).

In a case where the determination made in Step S205 is "Yes", in other words, in a case where the charging efficiency is determined to be within the threshold range by the control device 34, the process proceeds to Step S203, and the charging operation is continued.

On the other hand, in a case where the determination made in Step S205 is "No", in other words, in a case where the charging efficiency is determined to be equal to or less than the lower limit threshold and is not within the threshold range by the control device 34, it is determined that an abnormality has occurred in the power transmission device 6, the power reception device 32, or the like (Step S206).

Thereafter, it is determined whether or not the temperature of the primary coil 5 is equal to or higher than the threshold (Step S207).

In a case where the determination made in Step S207 is "Yes", in other words, in a case where the detection result acquired by the temperature sensor 16 (see FIG. 1) that is installed in the power transmission device 6 is equal to or higher than the threshold set in the control unit 13, application of the high-frequency current to the primary coil 5 is stopped (Step S208).

Subsequently, an alarm is transmitted from the alarm device 17 of the control unit 13 of the parking facility-side charging device 4 to the user through the parking facility-side transmission/reception unit 14 (Step S209).

On the other hand, in a case where the determination made in Step S207 is "No", in other words, in a case where the detection result acquired by the temperature sensor 16 that is installed in the power transmission device 6 is less than the threshold set in the control unit 13, the high-frequency current that is applied to the primary coil 5 is increased in consideration of a case where a magnetic foreign object M such as an iron scrap is present near the outer circumferential portion of the primary coil 5 (see FIG. 6B) (Step S210).

Here, the amount of increase in the high-frequency current is determined based on the counted value acquired by the timer 36 that is installed in the control device 34. In other words, it is preferable to complete charging within the target charging time set in advance by the control device 34. Accordingly, a remaining time from an elapsed time after starting the charging to the target charging time is calculated, and the high-frequency current is applied to the primary coil 5 such that the charging is completed in the remaining time, whereby the charging efficiency is increased.

In addition, for example, it may be configured such that a map in which the elapsed time after starting the charging and a charging efficiency are associated with each other is arranged in the control device 34, and the value of the high-frequency current that is applied to the primary coil 5 is determined by referring to the map.

As above, in a case where the value of the high-frequency current that is applied to the primary coil 5 is determined by referring to the remaining time until the target charging time, there is a concern that an overcurrent is generated in the primary coil 5, and the temperature of the primary coil 5 is equal to or higher than the threshold. Accordingly, after the high-frequency current applied to the primary coil 5 is increased, it is determined whether the temperature of the primary coil 5 is equal to or higher than the threshold (Step S211).

In a case where the determination made in Step S211 is "Yes", in other words, in a case where the detection result acquired by the temperature sensor 16 (see FIG. 1) that is installed in the power transmission device 6 is equal to or higher than the threshold set in the control unit 13, application of the high-frequency current to the primary coil 5 is stopped, and the process proceeds to Step S208.

On the other hand, in a case where the determination made in Step S211 is "No", in other words, in a case where the detection result acquired by the temperature sensor 16 (see FIG. 1) that is installed in the power transmission device 6 is less than the threshold set in the control unit 13, it is determined that an abnormality has not occurred in the power transmission device 6, the power reception device 32, or the like (Step S212).

Subsequently, the charging efficiency of the secondary coil 31 is calculated by the control device 34 of the vehicle-side charging device 3, and it is determined whether or not the calculated charging efficiency is equal to or higher than the upper limit threshold (Step S213). The result of the determination is transmitted as a signal from the control device 34 to the control unit 13 of the parking facility-side charging device 4.

In a case where the determination made in Step S213 is "No", in other words, in a case where the control device 34 determines that the charging efficiency is not equal to or higher than the upper limit threshold, it is determined whether or not the charging has been completed (Step S214).

In a case where the determination made in Step S214 is "No", in other words, in a case where the control device 34 determines that the charging has not been completed, the process is returned to Step S201, and the charging efficiency of the secondary coil 31 is calculated.

On the other hand, in a case where the determination made in Step S214 is "Yes", in other words, in a case where the control device 34 determines that the charging has been completed, the charging operation ends (Step S215).

On the other hand, in a case where the determination made in Step S213 is "Yes", in other words, in a case where the control device 34 determines that the charging efficiency is equal to or higher than the upper limit threshold and is not within the threshold range, it is assumed that a magnetic foreign object M is present between the primary coil 5 and the secondary coil 31 (see FIG. 6C). Accordingly, it is determined that an abnormality has occurred in the power transmission device 6, the power reception device 32, or the like (Step S216).

Subsequently, it is determined whether or not the temperature of the primary coil 5 is equal to or higher than the threshold (Step S217). The reason for this is for determining whether or not a magnetic foreign object such as an iron scrap passes between the primary coil 5 and secondary coil 31 due to a wind or the like, and the charging efficiency temporarily increases to be equal to or higher than the upper limit threshold.

In a case where the determination made in Step S217 is "No", in other words, in a case where the detection result acquired by the temperature sensor 16 (see FIG. 1) that is installed in the power transmission device 6 is less than the threshold set in the control unit 13, it is determined that the charging efficiency temporarily increases to be equal to or higher than the upper limit threshold, and it is determined that an abnormality has not occurred in the power transmission device 6, the power reception device 32, or the like (Step S218). Thereafter, the process proceeds to Step S214.

On the other hand, in a case where the determination made in Step S217 is "Yes", in other words, in a case where the detection result acquired by the temperature sensor 16 (see FIG. 1) that is installed in the power transmission device 6 is equal to or more than the threshold set in the control unit 13, it is determined whether or not a predetermined time has elapsed after the abnormality is checked by referring to the counted value of the timer 36 that is installed in the control device 34 (Step S219).

In a case where the determination made in Step S219 is "No", in other words, in a case where the predetermined time is determined not to have elapsed, the charging efficiency is determined to have temporarily increased to be equal to or higher than the upper limit threshold, and the determination of Step S217 is performed again.

On the other hand, in a case where the determination made in Step S219 is "Yes", in other words, in a case where the predetermined time has elapsed, it is determined that a magnetic foreign object M is present between the primary coil 5 and the secondary coil 31. Thereafter, it is determined whether or not the high-frequency current that is applied to the primary coil 5 can be decreased (Step S220).

Here, the reason for determining whether or not the high-frequency current applied to the primary coil 5 can be decreased is that, in a case where a minimum high-frequency current is not applied to the primary coil 5, sufficient magnetic fluxes are not generated in the primary coil 5, and electromagnetic coupling between the primary coil 5 and the secondary coil 31 cannot be made.

In other words, in the control unit 13, a minimum value of the high-frequency current for which the primary coil 5 and the secondary coil 31 can be electromagnetically coupled is stored as a minimum threshold. In Step S220, it is determined whether the high-frequency current can be decreased from a current high-frequency current value while the high-frequency current applied to the primary coil 5 is maintained to be equal to or higher than the minimum threshold.

In a case where the determination made in Step S220 is "No", in other words, in a case where the high-frequency current applied to the primary coil 5 cannot be decreased, application of the high-frequency current to the primary coil 5 is stopped (Step S221).

Thereafter, an alarm is transmitted to the user from the alarm device 17 of the control unit 13 of the parking facility-side charging device 4 through the parking facility-side transmission/reception unit 14 (Step S222).

On the other hand, in a case where the determination made in Step S220 is "Yes", in other words, in a case where the high-frequency current applied to the primary coil 5 can be decreased, the high-frequency current is decreased (Step S223).

Subsequently, it is determined whether or not the charging efficiency is less than the upper limit threshold and is within the threshold range (Step S224).

In a case where the determination made in Step S224 is "No", in other words, in a case where the control device 34 determines that the charging efficiency is still equal to or higher than the upper limit threshold, the process is returned to Step S220 again, and it is determined whether or not the high-frequency current that is applied to the primary coil 5 can be decreased.

On the other hand, in a case where the determination made in Step S224 is "Yes", in other words, in a case where the control device 34 determines that the charging efficiency is less than the upper limit threshold and is within the threshold range, it is determined that an abnormality has not occurred in the power transmission device 6, the power reception device 32, or the like (Step S225).

Thereafter, the process proceeds to Step S214, and it is determined whether or not charging has been completed, and, when charging has been completed, the charging operation ends (see Step S215).

(Advantages)

Therefore, according to the above-described embodiment, the control device 34 that calculates the charging efficiency is arranged in the vehicle-side charging device 3, the control unit 13 to which the determination result acquired by the control device 34 is input is arranged in the parking facility-side charging device 4, and the value of the high-frequency current that is applied to the primary coil 5 is controlled in accordance with the change in the charging efficiency, whereby the charging can be completed within the target charging time effectively and appropriately. In other words, the charging operation can be performed most efficiently in accordance with any one of the case where the relative position between the primary coil 5 and the secondary coil 31 is deviated (see FIG. 6A), a case where a magnetic foreign object M such as an iron scrap or the like is present near the outer circumferential portion of the primary coil 5 (see FIG. 6B), and a case where a magnetic foreign object M is present between the primary coil 5 and the secondary coil 31 (see FIG. 6C).

In addition, the temperature sensor 16 that detects the temperature of the primary coil 5 is arranged in the power transmission device 6, and the heat-resistant temperature of the primary coil 5 is set in the control unit 13 of the parking facility-side charging device 4 as a threshold. Accordingly, damage in the non-contact charging system 1 due to heat generation of the primary coil 5 and the secondary coil 31 can be prevented. Particularly, since the control unit 13 improves the charging efficiency in a range in which the temperature of the primary coil 5 does not exceed the threshold, the charging can be controlled so as to be completed within the target charging time while suppressing the influence of the magnetic foreign object M to be minimal.

In addition, even in a case where the charging efficiency increases to exceed the upper limit threshold due to the influence of the magnetic foreign object M, the high-frequency current that is applied to the primary coil 5 can be decreased in a possible range.

Accordingly, the charging operation can be continued while the temperature of the primary coil 5 is suppressed to be less than the threshold without stopping the charging operation unlike the conventional technique. Therefore, it is possible to complete the charging in accordance with the target charging time without being influenced by a magnetic foreign object M or the like.

Furthermore, by stopping charging in a case where the temperature of the primary coil 5 is equal to or higher than the threshold, damage in the power transmission device 6 and the power reception device 32 due to an overcurrent can be reliably prevented.

In addition, the timer 36 is arranged in the control device 34, and it is determined whether or not a magnetic foreign object M temporarily passes between the primary coil 5 and the secondary coil 31 based on the counted value acquired by the timer 36. Accordingly, an erroneous determination can be prevented by being made by the control device 34, and the control device 34 can be controlled so as to complete charging within the target charging time.

In addition, the driving device 7 is arranged in the parking facility-side charging device 4, and, in a case where the relative position between the primary coil 5 and the secondary coil 31 is deviated by a certain external force after starting charging, the position of the primary coil 5 is readjusted by the driving device 7. Accordingly, a decrease in the charging efficiency due to the deviation of the primary coil 5 can be reliably prevented, and an erroneous determination of the control device 34 that a decrease in the charging efficiency is influenced by a magnetic foreign object M can be reliably prevented. Therefore, an overcurrent is prevented from being supplied to the primary coil 5.

Furthermore, by arranging the alarm device 17 in the control unit 13, a user can be instantly notified of the state in which the charging operation is stopped due to abnormality generated in the non-contact charging system 1. Accordingly, for example, the user can perform an appropriate treatment such as an operation of removing a magnetic foreign object M added between the primary coil 5 and the secondary coil 31, and the charging operation can be restored in a speedy manner.

In addition, the present invention is not limited to the above-described embodiment and includes a system acquired by adding various changes to the above-described embodiment in the range not departing from the concept of the present invention.

For example, in the above-described embodiment, a case has been described in which the control device 34 is arranged in the vehicle-side charging device 3, and the control unit 13 is arranged in the parking facility-side charging device 4. However, the control device 34 may be arranged in the parking facility-side charging device 4, and the control unit 13 may be arranged in the vehicle-side charging device 3. In such a case, the control device 34 may have the function of the control unit 13 for controlling the driving device 7 and the range specifying device 8.

In addition, in the above-described embodiment, a case has been described in which the temperature sensor 16 that detects the temperature of the primary coil 5 is arranged in the power transmission device 6, and the heat-resistant temperature of the primary coil 5 is set in the control unit 13 of the parking facility-side charging device 4 as a threshold. However, the present invention is not limited to this embodiment but it may be configured such that a temperature sensor (second temperature detecting unit) 35 detecting the temperature of the secondary coil 31 is also arranged in the power reception device 32 (see FIG. 1), and the high-frequency current applied to the primary coil 5 is controlled based on the temperature of at least one of the primary coil 5 and the secondary coil 31.

In other words, it may be configured such that only a temperature sensor 35 that detects, for example, the temperature of the secondary coil 31 is arranged, and the high-frequency current applied to the primary coil 5 is changed based on the detection result acquired by the temperature sensor 35.

Even in such a case, since the temperature of the primary coil 5 is assumed to approximate to the temperature of the secondary coil 31, the advantages of the above-described embodiment can be acquired. In such a case, it may be configured such that, for example, the threshold of the heat-resistant temperature of the secondary coil is set in the control device 34 or the control unit 13, and, in a case where the charging efficiency is equal to or higher than the upper limit value, the control device 34 or the control unit 13 decreases the current supplied to the primary coil 5 while maintaining the temperature of the secondary coil to be less than the threshold.

In addition, for example, both the temperature sensor 16 that detects the temperature of the primary coil 5 and the temperature sensor 35 that detects the temperature of the secondary coil 31 may be arranged. In such a case, for example, when the charging efficiency decreases, a detection result acquired by the temperature sensor 35 that detects the temperature of the secondary coil 31 is transmitted to the control unit 13 as a signal, and the control unit 13 changes the high-frequency current applied to the primary coil 5 based on the detection result acquired by the temperature sensor 35. In this case, since the control unit 13 is controlled based on the temperature of the secondary coil 31 that is higher than the temperature of the primary coil 5, damage due to heat can be prevented.

On the other hand, when the charging efficiency increases, the detection result acquired by at least one of the temperature sensor 16 and the temperature sensor 35 is transmitted to the control unit 13 as a signal, and the control unit 13 changes the high-frequency current applied to the primary coil 5 based on the detection result acquired by at least one of the temperature sensor 16 and the temperature sensor 35. In such a case, since the temperature of the primary coil 5 is regarded to approximate the temperature of the secondary coil 31, the advantages of the above-described embodiment can be acquired even by controlling the control unit 13 based on the temperature of the primary coil 5. In addition, by performing the control operation based on the temperatures of both the primary coil 5 and the secondary coil 31, damage due to heat can be prevented more accurately.

In addition, in the above-described embodiment, a case has been described in which the alarm device 17 is arranged in the control unit 13, and the alarm device 17 transmits an alarm to a user, for example, through the parking facility-side transmission/reception device 14.

However, the present invention is not limited to this embodiment, and it may be configured such that a warning sound is emitted from the alarm device 17, and the user is notified of the abnormality of the non-contact charging system 1 through the warning sound.

In addition, the installation position of the alarm device 17 is not limited to the control unit 13, but the alarm device 17 may be arranged in a place other than the control unit 13 of the parking facility-side charging device 4, and the alarm device 17 may be arranged in the vehicle-side charging device 3.

INDUSTRIAL APPLICABILITY

A non-contact charging system can be provided which can complete charging within a target charging time by proper charging without being influenced by a magnetic foreign object.

REFERENCE SYMBOL LIST

1 non-contact charging system
2 electric vehicle 2a vehicle body
3 vehicle-side charging device
4 parking facility-side charging device
5 primary coil (power transmission coil)
6 power transmission device
7 driving device
8 range specifying device
8a calculation unit
9 arm unit
10 wheel stopper
12 tire detecting sensor
13 control unit (control device)
16 temperature sensor (first temperature detecting device)
17 alarm device (alerting device)
31 secondary coil (power reception coil)
32 power reception device
34 control device
35 temperature sensor (second temperature detecting device)
P optimal position

What is claimed is:

1. A non-contact charging system comprising:
a power transmission device that includes a primary coil supplying electric power through electromagnetic induction;
a power reception device that includes a secondary coil receiving the electric power by being electromagnetically coupled with the power transmission device; and
a temperature detecting device that determines a temperature of the secondary coil;
a control device that determines charging efficiency from the primary coil to the secondary coil and changes a current supplied to the primary coil in accordance with the charging efficiency,
wherein a threshold of a heat-resistant temperature of the secondary coil is stored in the control device, and
wherein, in a case where the charging efficiency is equal to or higher than an upper limit value, the control device decreases the current supplied to the primary coil while keeping the efficiency above a lower limit value, and while maintaining the temperature of the secondary coil to be less than the threshold.

2. The non-contact charging system according to claim 1, further comprising another temperature detecting device that determines a temperature of the primary coil.

3. The non-contact charging system according to claim 2, wherein a threshold of a heat-resistant temperature of the primary coil is stored in the control device, and
wherein, in a case where the charging efficiency is equal to or less than a lower limit value, the control device increases the current supplied to the primary coil while maintaining the temperature of the primary coil to be less than the threshold.

4. The non-contact charging system according to claim 2 or 3,
wherein a threshold of a heat-resistant temperature of the primary coil is stored in the control device, and
wherein, in a case where the charging efficiency is equal to or higher than an upper limit value, the control device decreases the current supplied to the primary coil while maintaining the temperature of the primary coil to be less than the threshold.

5. The non-contact charging system according to claim 3, wherein, in a case where the temperature of the primary coil is equal to or higher than the threshold, the control device stops supplying the current to the primary coil.

6. The non-contact charging system according to claim 3, wherein, in a case where the temperature of the primary coil is equal to or higher than the threshold, the control device measures a time in which the temperature of the primary coil is equal to or higher than the threshold and stops supplying the current to the primary coil when the measured time passes a predetermined time.

7. The non-contact charging system according to claim 1, further comprising:
a driving device configured to move the power transmission device,
wherein the charging efficiency is defined based on an electric power that is received by the secondary coil and an electric power that is output by the primary coil, and
wherein, in a case where the charging efficiency is equal to or less than a predetermined value in a first time, the control device is configured not to change the current supplied to the primary coil and the driving device is configured to move the power transmission device to a position at which the charging efficiency becomes the maximum, and then the control device is configured to change the current supplied to the primary coil based on the new charging efficiency.

8. The non-contact charging system according to claim 1 or 2, further comprising a alerting device that alerts stopping supplying the current to the primary coil.

9. A non-contact charging system comprising:
a power transmission device that includes a primary coil supplying electric power through electromagnetic induction;
a power reception device that includes a secondary coil receiving the electric power by being electromagnetically coupled with the power transmission device; and
a control device that determines charging efficiency from the primary coil to the secondary coil and changes a current supplied to the primary coil in accordance with the charging efficiency; and
a driving device configured to move the power transmission device,
a temperature detecting device that determines a temperature of the secondary coil;
wherein the charging efficiency is defined based on an electric power that is received by the secondary coil and an electric power that is output by the primary coil,
wherein a threshold of a heat-resistant temperature of the secondary coil is stored in the control device,
wherein, in a case where the charging efficiency is equal to or less than a predetermined value in a first time, the control device is configured not to change the current supplied to the primary coil and the driving device is configured to move the power transmission device to a position at which the charging efficiency becomes the maximum, and then the control device is configured to change the current supplied to the primary coil based on the new charging efficiency, and
wherein, in a case where the charging efficiency is equal to or higher than an upper limit value, the control device decreases the current supplied to the primary coil while keeping the efficiency above a lower limit value, and while maintaining the temperature of the secondary coil to be less than the threshold.

* * * * *